United States Patent [19]

Stephenson et al.

[11] Patent Number: 4,930,056
[45] Date of Patent: May 29, 1990

[54] SNAP-ON FRAME FOR LIGHT FIXTURES

[75] Inventors: James G. Stephenson, Kalamazoo; Mark D. Huggett, Battle Creek, both of Mich.

[73] Assignee: Progressive Dynamics, Inc., Marshall, Mich.

[21] Appl. No.: 358,169

[22] Filed: May 30, 1989

[51] Int. Cl.⁵ .............................................. F21V 17/00
[52] U.S. Cl. ....................................... 362/364; 362/147
[58] Field of Search ................. 362/74, 135, 137, 140, 362/141, 142, 147, 364

[56] References Cited

U.S. PATENT DOCUMENTS

| D. 221,351 | 8/1971 | Remington | D48/32 |
| 3,156,415 | 11/1964 | Walker | 362/74 |
| 3,205,351 | 9/1965 | Walker | 362/74 |
| 4,353,592 | 10/1982 | Cziptschirsch | 362/735 X |
| 4,760,500 | 7/1988 | Peng | 362/74 |

FOREIGN PATENT DOCUMENTS 3144725  5/1983  Fed. Rep. of Germany ........ 362/74

Primary Examiner—Stephen F. Husar
Attorney, Agent, or Firm—Beaman & Beaman

[57] ABSTRACT

The invention relates to a snap-on frame for recreational vehicle light fixtures wherein the frame is formed of a synthetic plastic material and is added to the fixture to improve the appearance, and may also be employed to convert a fixture capable of being recess mounted to a surface mounting. An annular frame molded of a synthetic plastic semi-rigid resilient material includes protuberances on a skirt portion circumscribing the fixture edge and the dimensions of the protuberances are related to the fixture base dimension such that the mounting slightly distorts the normal frame configuration to frictionally mount the frame on the fixture base by a snap-on connection.

8 Claims, 1 Drawing Sheet

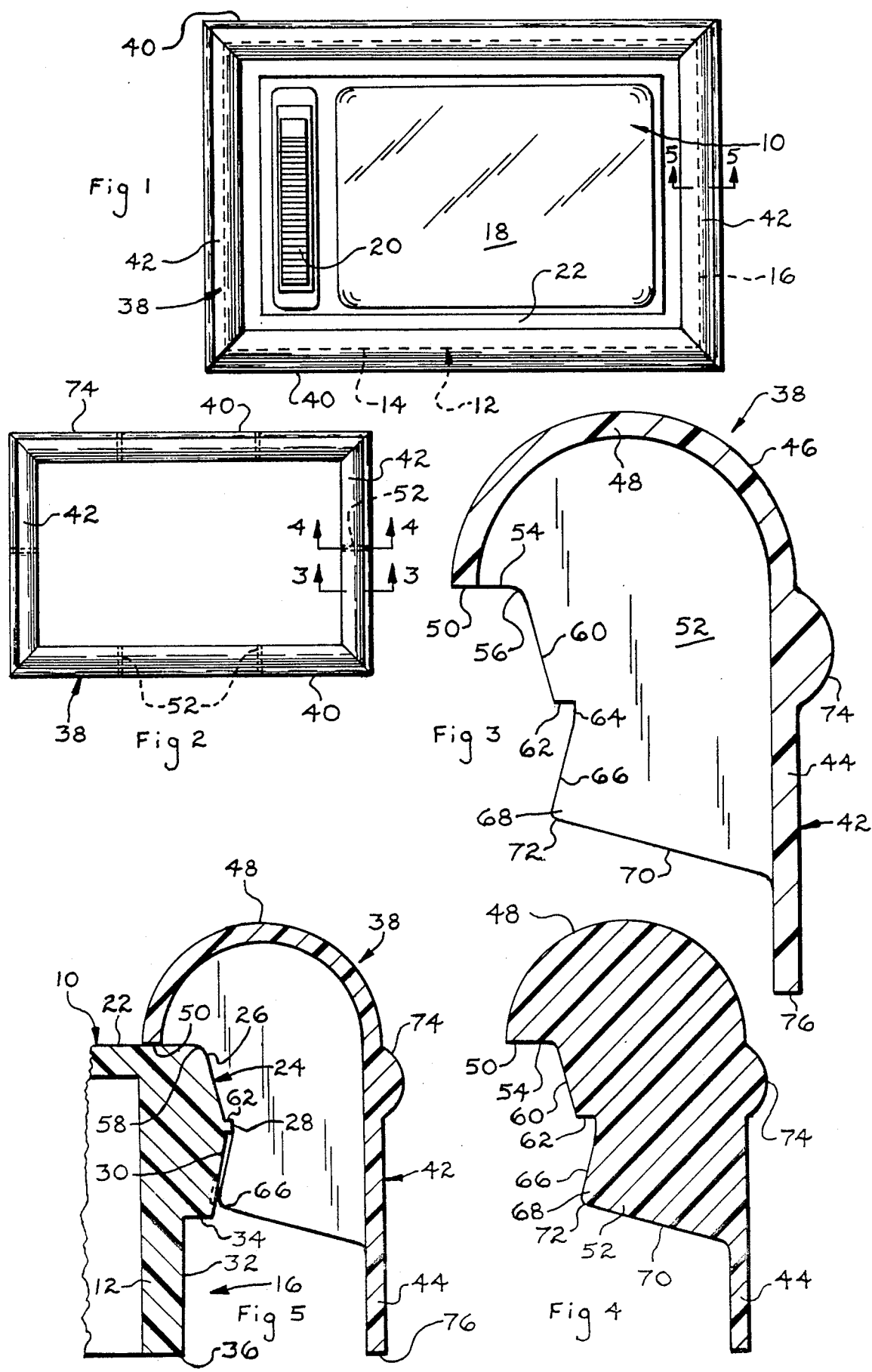

4,930,056

SNAP-ON FRAME FOR LIGHT FIXTURES

BACKGROUND OF THE INVENTION

Light fixtures commonly mounted upon ceilings and walls, particularly of the type used in recreational vehicles such as trailers, motor homes, and boats, are usually of relatively low profile in that their extension from the supporting surface is at a minimum, and, usually, such light fixtures are produced in high quantities and, are substantially similar in appearance, and must be manufactured and sold at relatively low cost. Usually, such light fixtures are formed of molded synthetic plastic components, and a typical light fixture of this general type is shown in the assignees U.S. Design Pat. No. 221,351.

While it is desireable to "customize" the light fixture to match the decor and color scheme of the area in which the fixture is mounted cost constraints and inventory limitations renders such customizing difficult.

It is an object of the invention to provide a snap-on frame for a lighting fixture wherein the frame circumscribes the fixture base and is firmly mounted thereon simply by a manual pressing-on operation without requiring tools or special skills.

Another object of the invention is to provide a decorative snap-on frame for light fixtures wherein the frame may be economically manufactured in a variety of colors or textures permitting coordinating of color or texture themes.

Yet another object of the invention is to provide a snap-on frame for light fixtures wherein the frame is formed of a molded synthetic plastic semi-rigid resilient material whereby the resiliency of the frame material provides the biasing force for maintaining the frame on the light fixture and no moving components or separate fasteners are required.

A further object of the invention is to provide a snap-on frame for light fixtures wherein the frame permits fixtures suitable for recess mounting to be surface mounted and the recess mounting configuration is shielded from view.

In the practice of the invention the light fixture usually includes a rectangular base having a peripheral edge and an outer face adjacent the edge. Usually the base edge includes an undercut surface spaced from the outer face which is obliquely related to the base outer face and converges toward the central projection of the base body. If the light fixture is shaped for recess mounting that portion of the base edge furthest from the outer face will be of a smaller dimension than the maximum dimension of the edge for insection into a recess in a complimentary opening.

The snap-on frame is formed of a synthetic plastic semi-rigid resilient material and, in the illustrated embodiment, is of an inverted J configuration as to include a skirt and an arcuate return portion extending from the skirt. The return portion includes an abutment surface adapted to engage the base outer face.

At the ends and sides of the rectangular frame thin wall ribs are homogeneously defined between the skirt and the return portion and are of such a configuration as to closely receive the light fixture base edge, but the ribs each include a protrusion adapted to engage the undercut surface of the base edge with an interference fit. Thus, when the frame is slipped over the light fixture base the protuberances will engage the base edge and be deflected outwardly against the resiliency of the frame, and in this manner an effective frictional engagement between the frame and base is produced which will maintain the abutment end of the frame return portion in engagement with the base outer face so that the light fixture and frame have the appearance of being an intergral unit.

The frame may be formed of various colors of material, or have various textures, such as simulated wood, defined on the outer surface of the frame whereby the mounting of the frame upon the light base gives the light fixture a distinctive attractive and customized appearance.

As the frame is molded of a single part the frame may be manufactured economically using high speed injection molding techniques, and the configuration of the frame permits the frame to be fitted to existing light fixtures and fixture base configurations not originally designed for use with the frame of the invention.

BRIEF DESCRIPTION OF THE DRAWINGS

The aforementioned objects and advantages of the invention will be appreciated from the following description and accompanying drawings wherein:

FIG. 1 is a plan view of an assembled light fixture and snap-on frame in accord with the invention;

FIG. 2 is a plan view of the frame, per se;

FIG. 3 is an elevational, sectional view as taken along section III—III of FIG. 2;

FIG. 4 is an elevational sectional view as taken along section IV—IV of FIG. 2, and FIG. 5 is an enlarged detailed elevational sectional view as taken along section V—V of FIG. 1.

DESCRIPTION OF THE PREFERRED EMBODIMENT

The light fixture with which the snap-on frame of the invention is used is illustrated in FIG. 1 as represented at 10 is of a generally rectangular configuration having a base 12 which includes parallel sides 14 and parallel ends 16. A lens 18 is mounted upon the base, and an electric bulb behind the lens, not shown, controlled by switch 20 provides illumination.

The transverse cross sectional configuration of the light fixture base 12 is best illustrated in FIG. 5. The outer face of the base is shown at 22, and the periphery edge of the base is generally represented at 24 and includes an oblique surface 26, a decorative rib 28, an undercut surface 30, and a recessed surface 32 defining shoulder 34. The innermost edge of the base is represented at 36. With the illustrated base configuration this base is adapted to be recessed mounted in a hole in the recreational vehicle ceiling or wall complimentary to the dimensions of the surface 32, and in such instance the shoulder 34 will rest upon the ceiling or wall and only the surfaces 26 and 30 and the rib 28 will be exposed to view with respect to the edge of the light fixture. If the light fixture 10 is surface mounted the edge 36 will directly engage the ceiling or wall surface.

The snap-on frame in accord with the invention is generally represented at 38 and is of an overall configuration similar to that of the light base, i.e. rectangular, and includes parallel sides 40 and parallel ends 42. The frame is preferably injection molded of a synthetic plastic material which hardens into a semi-rigid form and yet is stiffly resilient.

The transverse cross sectional configuration of the frame sides and ends will be apparent from sectional views FIGS. 3-5 wherein it will be appreciated that the frame cross section is of an inverted J form including a skirt 44 having a transition region at 46 forming the return portion 48 which is of a convex-concave form. The return portion 48 comprises a semi-circular form terminating in an abutment end 50 adapted to engage the light fixture base outer face 22 as later described.

At least one rib 52 is homogeneously molded into each of the sides 40 and ends 42 of the frame as will be apparent from the dotted lines of FIG. 2. The configuration of the ribs 52 will be appreciated from FIGS. 3-5 and the ribs extend between the skirt 44, portion 48 and the abutment end 50 having a configuration readily appreciated from FIGS. 3 and 4. The inner edge configuration of the ribs 52 includes a surface 54 coinciding with the abutment end 50 having a radius 56 equal to the radius 58 formed on the corner edge of the base periphery. A surface 60 corresponds to the base surface 26 and a shoulder 62 is located as to correspond with the configuration of the rib 28. The surface 64 intersects surface 62 and blends into surface 66 which defines protuberance 68 which is in the form of a radius which intersects with the rib lower surface 70. The intersection of the surfaces 66 and 70 at radius 72 constitutes the innermost dimension of the protuberance 68.

If desired, a decorative ridge 74 may be molded or fixed to the outer surface of the skirt 44 as indicated in the Figures. The frame material may be of a colored synthetic plastic and the outer surface may have a wood simulation grain defined thereon or other texture. If a wood grain texture is used the wood grain usually extends the length of the frame side or end associated therewith.

The dimension between the innermost portions of the protuberances 68 defined on the frame ends 44 or the opposed protuberances 68 defined on the frame sides 41 is slightly less than the opposed distances separating the corresponding base surfaces 30. Thus, upon the light fixture base 12 being mounted upon the recreational vehicle ceiling or wall as desired the frame 38 may be placed over the base and pushed thereon. Such action causes the protuberance 68 to ride over the base ribs 28 and due to the resilient nature of the frame the frame will distort to permit installation upon the base. When the frame is fully inserted on the base the abutment end 50 engages the base outer face 22 throughout the frame and the protuberances 68 will engage the associated undercut base surfaces 30. As shown in FIG. 5, the "normal" configuration of the protuberances is illustrated in dotted lines, but upon the frame being inserted upon the base the frame will be distorted outwardly so that the protuberances 68 will be firmly biased against the base surfaces 30 and thus create a firm and positive frictional innerconnection between the frame and base at each rib location. This innerconnection is sufficient to resist removal of the snap-on frame from the base and the frame will maintain its desired position regardless of the conventional vehicle vibrations to which it is subjected. The amount of distortion occurring at the protrusions when the frame and base are assembled is approximately 0.014". It is to be noted that the lower end 76 of the skirt 44 is in line with the base edge 36 and thus the frame will enclose the recess surface 32 permitting the base to be surface mounted and giving the fixture the appearance of a surface mount.

It will be appreciated from the above disclosure that the flexual strength of the synthetic plastic frame provides the retention of the frame 38 on the base 12, and a very attractive frame for the light base is achieved which is of a single part which may be readily and economically manufactured and installed.

It is appreciated that various modifications to the inventive concept may be apparent to those skilled in the art without departing from the spirit and scope of the invention.

What is claimed is:

1. A snap-on frame for light fixtures having a circumference defined by a periphery having opposite sides and including an outer face and an edge transversely disposed to the outer face comprising, in combination, a frame formed of synthetic plastic semi-rigid flexible, resilient material having an overall generally planar configuration complementary to that of the light fixture periphery, said frame including opposite sides each including an abutment surface, a skirt having an inner surface and a plurality of elongated spaced ribs, said ribs being affixed to said skirt inner surface and transversely disposed to the general plane of said frame and each including an inner surface, said ribs' inner surface including a protuberance, the distance between the protuberances on opposite sides of said frame being slightly less than the distance separating opposite sides of the fixture periphery whereby placing said frame upon the periphery of the fixture causes said protuberances to engage the fixture edge slightly deforming the frame whereby said frame is frictionally held on the fixture periphery.

2. In a snap-on frame light fixture as in claim 1, the fixture edge including undercut surfaces, said ribs' protuberance engaging the fixture edge undercut surfaces.

3. In a snap-on frame light fixture as in claim 1, said frame abutment surface engaging the fixture outer face upon said protuberances fully engaging the fixture edge.

4. In a snap-on frame light fixture as in claim 1, said frame having an inverted J shaped transverse cross section including an outer convex return portion extending from said skirt, said outer convex return portion terminating in an edge comprising said abutment surface, said outer convex return portion edge being adapted to engage the fixture outer face, said abutment surface orienting said frame to the fixture with respect to the fixture edge and outer face.

5. In a snap-on frame light fixture as in claim 4, said frame ribs each homogeneously extending from said outer convex return portion and said skirt.

6. In combination, a light fixture having a rectangular base including parallel sides and parallel ends together defining said base periphery, said base including an outer face adjacent said periphery, said base periphery including an edge transversely disposed to said outer face and having an undercut surface, a snap-on frame encompassing said base periphery, said frame including parallel sides and parallel ends, said frame being molded of a synthetic plastic semi-rigid resilient material and including an inwardly extending overlap portion and a skirt spaced from and substantially parallel to the adjacent frame edge having an inner surface, an abutment surface defined on said frame overlap portion adapted to engage said base outer face, and a plurality of protuberances defined on said frame skirt inner surface adapted to engage said frame edge undercut surface, the dimension between opposed protuberances normally being slightly less than the dimension between opposed base undercut surfaces whereby said base slightly distorts said frame from its normal configuration and said frame is frictionally mounted on said base.

7. In a combination as in claim 6, a plurality of inwardly extending spaced narrow ribs homogeneously defined on said frame's inner surface, said protuberances being defined on said ribs.

8. In a combination as in claim 6, said frame having an inverted J shaped transverse cross section including an outer convex return portion extending from said skirt, said outer convex return portion terminating in an edge comprising said abutment surface, said outer convex return portion edge being adopted to engage the fixture outer face, said abutment surface orienting said frame to the fixture with respect to the fixture edge and outer face.

* * * * *